INVENTOR.
ROBERT WAGNER
BY
Howson & Howson
ATTYS.

INVENTOR.
ROBERT WAGNER
BY Howson & Howson
ATTYS.

United States Patent Office 3,286,043

Patented Nov. 15, 1966

3,286,043

PHONOGRAPH RECORDER-REPRODUCER CARTRIDGE UTILIZING SUPERSONIC AND AUDIO FREQUENCY INPUTS

Robert Wagner, Ford Road, Denville, N.J.

Original application Jan. 17, 1958, Ser. No. 709,634, now Patent No. 3,042,757, dated July 3, 1962. Divided and this application Mar. 19, 1962, Ser. No. 181,236

3 Claims. (Cl. 179—100.41)

This constitutes a division of my U.S. patent application Serial No. 709,634, filed January 17, 1958, now U.S. Patent No. 3,042,757.

This invention relates to new mechanical recording apparatus and procedures wherein a high frequency excitation current is superimposed on the signal to be recorded, during the recording operation, and more particularly it relates to such improved recording apparatus which operates by embossing and to a combination machine adapted to both recording and reproducing.

An object of the invention is to provide improved stylus recording and reproducing procedures and apparatus which enable a greater fidelity, wider frequency response and a greater signal-to-noise ratio to be obtained than has been heretofore possible. Further, it is an object to provide a new recording technique which enables high fidelity recordings to be made by embossing with the use of an extremely small stylus pressure suitable also for reproducing.

The term "stylus" in modification of "recording" and "reproducing" is herein used in reference to the mechanical forming and tracking of a modulated groove on a record medium. Although advantages of the invention are particularly marked in connection with recording by the embossing method, no unnecessary limitation to embossing is intended since the invention has advantages also in connection with recording by a cutting operation.

Recording by embossing is preferred in many applications, especially in dictation machines, because it does not involve the removal of any particles from the body of the record medium. But the embossing method has not been generally accepted where high fidelity is desired because the embossing method has lacked in quality over other methods. This is because in embossing such high work load has been placed on the recorder stylus as to reduce both the fidelity and level of response; also, the fidelity has been impaired by spring-back of the record material. An approach to overcoming this problem has been to reduce the tip of the stylus, for example, to radii of the order of ¼ mil, and to bias the stylus against the record with only a few grams force so that the record material will not impose any appreciable load on the stylus to influence adversely its frequency response. However, in this approach there is produced such a light, shallow groove that it does not provide a satisfactory tracking guide for the reproducer stylus. If the bias force is increased to get a deeper groove, then such a small stylus will tear or scratch the surface of the record. If this tearing or scratching tendency is overcome by inclining the stylus to a so-called drag angle, then the finer definition which the smaller tipped stylus was intended to give is lost.

From my tests I have observed that a recorder having a small tipped stylus operating at low record pressure will produce a trackable groove by the embossing method when modulated at frequencies in the upper audio range but will not provide a trackable groove when modulated at lower frequencies. This observation led to the conception now proven by extensive tests that if a high frequency excitation of a substantial energy level is fed into the recorder along with the lower frequency signals to be recorded, then a trackable groove with high definition is obtained at all modulation frequencies below the excitation frequency. The excitation frequency is chosen suitably above the highest frequency of the signal to be recorded, preferably at a frequency at least twice the highest signal frequency so as to avoid intermodulation effects. For audio recording the excitation frequency should be in the supersonic range herein considered to be the frequencies above about 15,000 c.p.s. For high fidelity audio recording the excitation frequency should therefore be at least 30,000 c.p.s. or higher.

The invention is carried out with most effective results when the level of the supersonic excitation is sufficient to have a considerable heating effect on the recorder cartridge element. A cartridge element of a heat resistant type is now available in the form of the ceramics or ferro-electrics of which a preferred material is barium titanate. This heating of the element and especially the frictional heating of the stylus from its high energy level of supersonic vibration in the record material operates to reduce the dynamic load of the record material on the stylus to increase its response to the signals being recorded. As a result, not only is there obtained a greater efficiency in electromechanical translation enabling a recording at higher levels and with increased signal-to-noise ratios, but also there is obtained a greater fidelity both during recording and reproducing in that the stylus follows more faithfully the impressed signals during recording and produces a modulated groove which can be tracked more faithfully during reproducing.

A feature of my invention resides in an improved mounting for a ferro-electric cartridge element, which enables a flat response to be obtained through the audio and into the supersonic frequency range without the use of any damping material. This elimination of damping material makes it possible to build a cartridge which is entirely of a heat-resistant construction capable of receiving the desired high level of high frequency excitation according to the invention. In this improved mounting, a beam of ferro-electric material is held fixed at one end and provided with a stylus at its other or free end, but the beam is constrained at an intermediate point to pivotal movement to force there a node in its vibration. Although so constrained, the beam has still an efficient response. In fact the purpose of forming a nodal point by rigid restraint is to make the beam responsive to the supersonic frequency so that it will resonate (i.e., develop a large amplitude of vibration even with a small energy input) in a standing wave having a node at the nodal point on the beam. When such cartridge element is energized by a high frequency excitation and the cartridge is mounted on a compliant arm as described in my application Serial No. 635,008, filed January 18, 1957, now Patent No. 2,941,810, and entitled, Phonograph, it is necessary to remove only the high frequency excitation to use the cartridge for reproducing since the same pressure of the stylus against the record and the same mounting of the cartridge can be used both for recording and reproducing.

Further objects of the invention are to form modulated signal-representing grooves in record media with smaller tipped styli and by less pressure than has been heretofore possible, to form such grooves in a manner which will not tear the record material and with such depth as will enable the grooves to be tracked faithfully at all frequencies of modulation throughout the audio range, to provide an improved mode of recording which enables a given quality of recordation to be achieved at much slower groove speeds than has been heretofore possible, to provide a mode of recording which reduces the load imposed by the record medium on the stylus at the frequencies to be recorded with resultant greater recording efficiency, to provide a heat-resistant recorder-reproducer cartridge requiring no damping and having a substantially flat response throughout the audio range and into the supersonic range, and to provide a form of cartridge which is usable with the same stylus and pressure for both recording and reproducing.

Another object of the invention is to fulfill the aforestated objectives by feeding a continuous high energy level supersonic exciting current into the recorder along with the signal to be recorded.

Another object is to provide a control circuit for cutting off the feed of the high frequency exciting current into the recorder both when the record is stopped and when the machine is conditioned for reproducing.

These and other features and objects of my invention will be apparent from the following description and the appended claims.

In the description of my invention reference is had to the accompanying drawings, of which:

Figure 4:
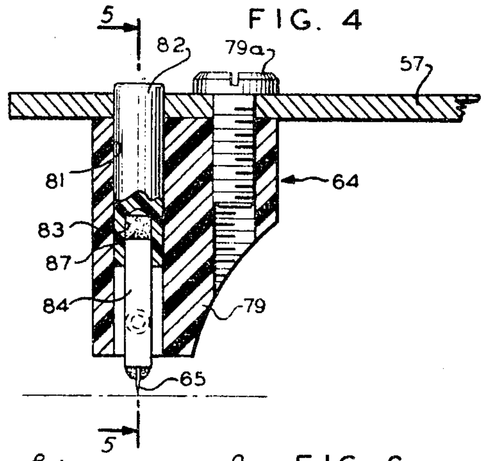
Figure 5:
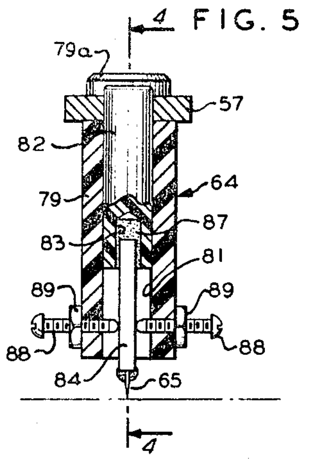
Figure 6:
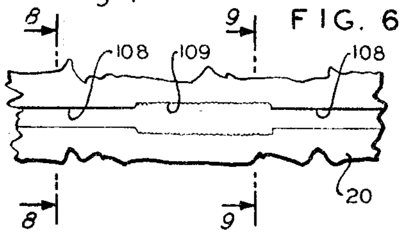
Figure 7:
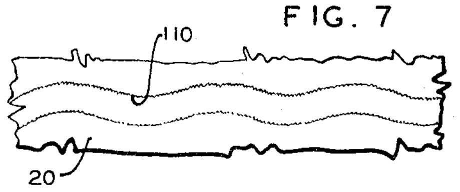
Figure 8:
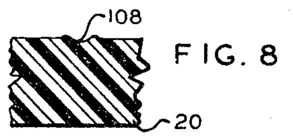
Figure 9:
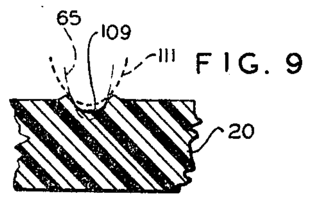
Figure 10:
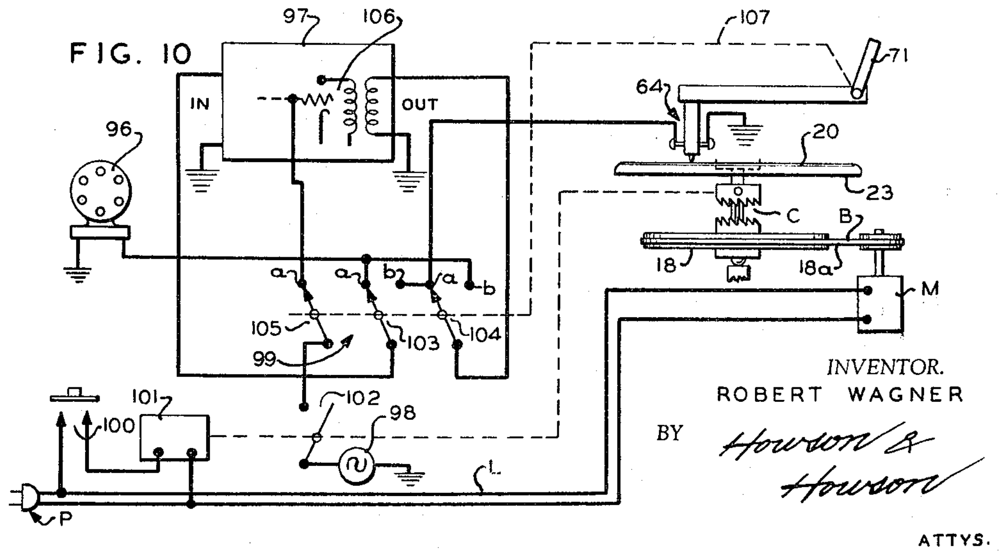

FIGURES 4 and 5 are vertical sectional views to enlarged scale of the recorder-reproducer cartridge taken on the lines 4—4 and 5—5 of FIGURES 5 and 4 respectively;

FIGURES 6 and 7 are fractional plan views to enlarged scale of a record surface bearing respectively an unmodulated and a modulated groove illustrating the benefit of my invention;

FIGURES 8 and 9 are cross-sectional views through the record medium respectively on the lines 8—8 and 9—9 of FIGURE 6; and FIGURE 10 is an electrical circuit diagram for a machine embodying the present invention.

The phonograph shown in the accompanying figures has a mounting plate 10 which is supported by a lower housing structure (not shown) and which forms the base for an upper housing section 11 secured thereto as by lugs 12 struck outwardly from the housing section. Mounted in the cabinet formed by the plate 10 and upper housing section 11 is a frame 13 cast as of aluminum. The frame is mounted flat on the plate 10 in the rearward half of the cabinet (the right half of the machine as it appears in FIGURE 2) and is secured to the plate 10 by screws as indicated at 14. The frame has a hollow rectangular cage-like portion 15 at the center of the machine provided with vertically-spaced bearings in the upper and lower walls thereof. Journalled in these bearings is a vertical shaft 16 which extends through clearance openings in the top and bottom of the cabinet. The shaft 16 is located vertically by abutment against the top and bottom walls of the cage 15 of a worm 17 secured to the central portion of the shaft. Mounted rotatably on the lower portion of the shaft 16 and supported vertically by a thrust bearing **16*a* is a large flywheel 18. This flywheel is driven by a motor M via a belt 18*a***. The flywheel itself is connectable to the shaft at will by a clutch C.

Figures 1, 2:
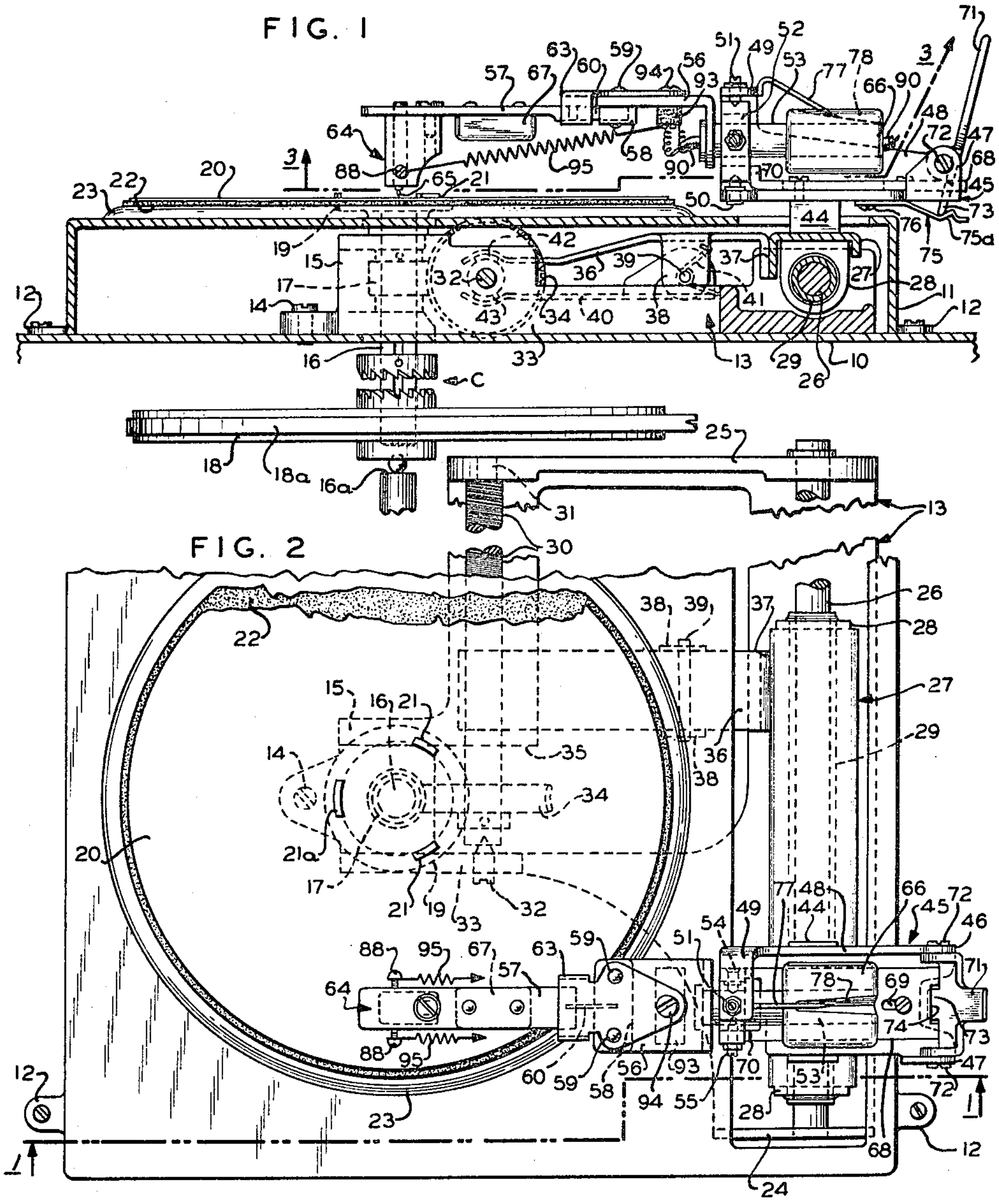
FIGURE 1 is a side elevational view, with parts shown in section on the line 1—1 of FIGURE 2, of an illustrative phonograph recording mechanism embodying my invention.
FIGURE 2 is a fractional plan view of this phonograph mechanism.

Secured to the upper end of the shaft 16 is a circular drive plate 19 for engaging only the central hub portion of a disc record 20. This drive plate has lugs 21 struck upwardly from the rim thereof, which are arcuate about the shaft 16 as a center and which are adapted for engaging corresponding arcuately-shaped drive slots in the disc record. Preferably, one of the drive lugs, designated **21*a* in FIGURE 2, is provided with a greater arcuate length than the others, as is also one of the drive holes in the disc record, so that the record can be mounted in only one angular orientation with respect to the shaft 16. The disc record is made preferably of a thin-flexible-plastic material such as Vinylite. The annular usable portion of the disc record is supported slidably by an annular stationary pad 22 of a yieldable material such as felt, which pad is mounted on the top wall of the cabinet at a level just slightly higher than that of the central drive plate 19 to assure that the disc record will lie flat at all times on the supporting pad. For instance, the pad 22 may be mounted on a slightly-raised circular platform 23** formed in the top wall of the cabinet. By using a flexible disc record driven from its hub portion and supported slidably throughout its usable portion on a soft, yieldable pad, machine vibration is prevented from being transmitted to the record either via the drive shaft or the frame.

The frame 13 has an upright standard 24 at its right end and an upright standard 25 along its left side. These standards carry a transverse support rod 26 for a carriage 27. The main portion of the carriage is in the form of a bail overlying the support rod 26 and having apertured lugs 28 bent downwardly from the ends thereof. Engaging these lugs is a tubular bearing 29 which is slidable on the support rod. The carriage is driven progressively along the support rod by a feed screw 30 journaled at its left end on a pivot 31 carried by the standard 25 and at its right end on a cone pivot 32 carried by the standard 33 upstanding from the frame 13 just to the rear of the cage 15. Secured to the right end portion of the feed screw is a gear 34 which meshes with the worm 17 on the drive shaft 16. Clearance for the gear is provided by an opening 35 in the bottom wall of the frame 13.

The means for coupling the carriage 27 to the feed screw comprises a forwardly extending arm 36 bracketed at 37 to the carriage. This arm terminates at its forward end in an arcuate portion overlying the feed screw. Bent downwardly from an intermediate portion of the arm 36 are side lugs 38 traversed by a rod 39 on which a lower arm 40 is pivoted. The arm 40 terminates in an arcuate portion below the feed screw. Under influence of a torsion spring 41 between the lower arm 40 and one of the lugs 38, the two arms 36 and 40 are clamped against the feed screw, it being understood that the arms find an equalized clamping position since the carriage is free to pivot on the support rod 26. However, the arms 36 and 40 do not engage the feed screw directly but through respective felt pads 42 and 43. The feed screw is provided with a very fine thread and the pads are made quite wide so as to engage the feed screw over a multiplicity of these threads. In so doing there is obtained an averaging out of the engagement with the individual threads to provide a very uniform driving action. Also, because of the resilient nature of the clamping engagement of the arms with the feed screw, transmission of vibration from the drive mechanism to the carriage is effectively reduced. This form of a carriage-drive mechanism is very satisfactory for producing microgrooved recordings of the order of 500 grooves per inch or more.

Preferably, the feed screw should be provided with a number of threads per inch equal to or not less than about half of the number of grooves to be formed on the record. Although this pad-screw clamping arrangement provides a very positive and reliable drive of the carriage, the carriage can nonetheless be moved by hand without the necessity of releasing the clamping engagement of the pad with the feed screw, and yet the pad will not undergo appreciable wear as the carriage is so moved because of the fineness of the threads on the feed screw.

On the right end portion of the carriage there is a mounting block 44 on the top side of which is secured a bracket 45, each being secured to the other as by a welding or riveting operation. The bracket 45 is in the form of a horizontal rectangular plate having upright left and right side lugs 46 and 47 at its back end. The left side lug merges with a left side wall 48 extending to the front of the bracket and provided there with an arm 49 overhanging the bottom plate. In the front portion of the bottom plate and in the arm 49 are respective cone pivots 50 and 51 which engage a gimbal ring 52 to support it for pivotal movement on a vertical axis. Extending with clearance through this ring is a tube 53 supported by left and right cone pivots 54 and 55 in the gimbal ring. The tube has thus a universal freedom of pivotal movement with respect to the carriage 27. Staked to the front end of the tube 53 is an apertured lug of an L-bracket 56 extending forwardly in line with the tube. A recorder-reproducer arm 57—hereinafter referred to as a tone arm—is secured to the bracket 56 in line therewith but with a compliant coupling to provide the tone arm with lateral freedom of movement relative to the carriage. For this purpose a block 58 is secured to the underside of the L-bracket 56 as by rivets 59, and is provided with a vertical crosscut into which a flat spring 60 is inserted at one end and secured as by welding. The forward end of this flat spring is secured similarly in a vertical crosscut provided in the back end of the tone arm 57. In order to damp the transverse vibratile movement of the tone arm relative to the carriage, the portion of the flat spring 60 intervening between the block 58 and arm 57 is encased in a block 61 of viscous material such as that known as Viscoloid. Also, the rear end portion of arm 57 may itself be embraced by pads 62 of such damping material interposed between the sides of the arm and the side legs of a U-bracket 63 overhanging the front end of L-bracket 56 and secured thereto as by the rivets 59. Mounted on the outer end of the tone arm 57 is a recorder-reproducer cartridge 64 having a stylus 65 at its lower end for engaging the record 20.

On a portion of the tube 53 extending rearwardly from its pivotal mounting to gimbal ring 52, is a counterbalancing weight 66. This weight is so chosen relative to a second counter weight 67 on the arm 57 that there will be left a light bias of the stylus against the record of the order of 3 to 5 grams. During recording, the gimbal ring is locked relative to the carriage by a horizontal shiftable locking plate 68 mounted slidably on the top surface of the bottom plate 27 of the bracket 45 by pin slot connections 69. This locking plate has laterally-spaced upright lugs 70 at its forward end which are brought to bear against diametrically-opposite portions of the gimbal ring 52 as the locking plate is pressed forwardly. The locking plate is shiftable by a manual lever 71 having side ears pivoted at 72 to the lugs 46 and 47 of the bracket 45. This manual lever has a depending arm 73 engaging an opening 74 in the locking plate to couple the lever to the plate. Engaging the lower end portion of this arm is a cantilever spring 75 riveted at 76 to the underside of the bracket 45 and provided with a V-shaped end portion **75*a*. This V-shaped end portion engages the arm 73 under pressure to provide an overcenter biasing of the manual lever 71. By this overcenter biasing the locking plate is urged forwardly to perform its locking function on the gimbal ring when the manual lever is in its rearward or record position shown in FIGURE 1. As the lever is shifted forwardly into reproduce position the locking plate is freed from the gimbal ring to allow lateral movement of the tone arm for better tracking of the stylus with the groove on the record. Should the carriage be rocked rearwardly to raise the tone arm from the record—which is a preliminary move to shifting the carriage by hand—a wire-like cantilever spring 77 firmly secured to the arm 49 of the bracket 45 will engage a V-notch 78 in the top face of the counterbalancing weight 66 to center the tone arm with respect to the carriage. When the tone arm is returned onto the record, this cantilever spring is moved free of the V-notch 78** so that the tone arm will again have lateral freedom of movement to track the record.

Figure 3:
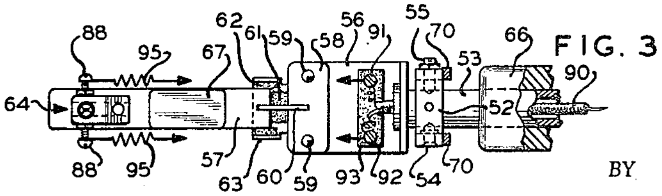
FIGURE 3 is a bottom plan view of the recorder-reproducer arm and cartridge as seen from the line 3—3 of FIGURE 1.

Since a feature of the present invention is in feeding a high frequency oscillating current, preferably a supersonic frequency, into the recorder along with the audio signal to be recorded during the recording operation, there is required a recorder cartridge having an efficient response extending into the supersonic range. Efficient response is promoted by using forced resonance vibration at the supersonic frequency to achieve a large amplitude effect for a relatively small energy input in the course of recording. Resonance is promoted by selection of beam length between the rigid end support and the rigid nodal support so that the fixed supersonic frequency will induce a standing wave along the beam having a node at the nodal point on the beam. Also, since my invention is carried out preferably by feeding a high energy level of supersonic oscillating current into the recorder cartridge such as will result in a substantial heating of the recorder element, I use preferably a cartridge with a ferro-electric or ceramic beam made of barium titanate. I have found that if such beam element is mounted in cantilever fashion and is clamped at an intermediate point to provide there a node in its vibration, the beam will have a substantially flat response throughout the audio range and extending well into the supersonic range. It is important, of course, that the resonance point of the beam be well above the audio range as resonance within the audio range would completely upset the desired flat response. Thus, the cartridge 64 shown in detail in FIGURES 3, 4 and 5 may comprise a block 79 of insulating material such as Lucite having a headed screw **79*a* threaded into the top wall thereof and passing through a hole 80 in the end of the tone arm 57 to secure the block to the arm. The block has a bore 81 extending vertically therethrough and into the upper portion of whicht here is fitted a plug 82 also of insulating material such as of Lucite. This plug projects above the top face of the block and engages the opposite walls of the slot 80 to serve as a locating pin for the cartridge. The plug terminates in the bore 81 about midway of the height of the block and has an axial cavity 83 in the lower end portion thereof. Engaging this cavity is the upper end portion of a vertical ferro-electric beam 84 made of barium titanate. This beam extends through the remaining length of the bore 81 and beyond the lower face of the block 79 and has the stylus 65** secured thereto by a heat-resistant cement such as an epoxy resin.

The beam 84 in this embodiment is rectangular in cross section as is the cavity 83 and is so dimensioned as to fit the cavity 83 along both of its narrower sides as shown in FIGURE 4. Filling the space in the cavity at the end and along the wider sides of the beam is a heat-resistant cement 87 also preferably of an epoxy resin, as shown in FIGURE 5. About one-third from the lower end of the beam 84 there are two horizontal screws 88 threaded toward one another through opposite side walls of the block 79 and on a diameter line of the bore 81 against the opposite under sides of the beam. These screws are secured in place by lock nuts 89. These screws force a pivot or nodal point in the bending of the beam. By providing such intermediate pivot-type clamping of the beam, the response thereof is maintained nearly uniform throughout the audio and into the supersonic range and yet there is preserved a high level of electromechanical efficiency.

The beam 84 is provided with conductive films or electrodes on its outer faces by which a voltage can be applied thereto to cause the beam to deflect in the plane of the paper as it appears in FIGURE 5. Lead connections may be made to these electrodes via the clamping screws 88. Thus, a shielded wire 90 may be passed through the tube 53 and have the shield and wire thereof connected respectively to terminals 91 and 92 mounted on an insulating block 93 held to the underside of the L-bracket 56 by a screw 94. Connections from these terminals to the clamping screws may be made by respective tension springs 95.

As shown in the circuit diagram of FIGURE 10, a machine enbodying the present invention may have a combination microphone-receiver 96, an electronic amplifier 97, a source 98 of high frequency oscillation, a record-reproduce switch 99, a start-stop switch 100 and a solenoid 101 for operating an oscillator control switch 102 and the clutch C. Power to the machine is provided via a plug P and a power line L. For purposes of simplifying the drawing and description a single line circuit is shown with ground return. The record-reproduce switch 99 is of three-pole double-throw type comprising switch poles 103, 104 and 105 each operable between respective contacts designated by the letters "*a*" and "*b*." During recording, the transducer 96 operating as a microphone is connected through the pole 103 and its "*a*" contact to the cartridge 64 operating as a recorder. Rotation of the turntable is started by pressing a start-stop switch 100 the effect of which is to complete an energizing circuit for the solenoid 101. Operation of this solenoid closes switch 102 and engages the clutch C. When the switch 102 is closed, the oscillator 98 is connected through switch 102 and pole 105 via its associated "*a*" contact to the input of the power stage 106 of the amplifier 97. The advantage in using the output stage of the amplifier both for the audio and the supersonic superimposed signals is that it reduces the power output requirements of the oscillator 98. By controlling the oscillator in conjunction with the start-stop means of the machine so that the supersonic oscillations are fed to the cartridge only while the machine is running, the recorder stylus is prevented from indenting the record while the record is at standstill. The record-reproduce switch 99 is coupled to the manual lever 71 as indicated by the tie line 107 in FIGURE 10 so that this switch will be controlled also by the lever as the lever is shifted between record and reproduce positions. Thus, when the lever 71 is shifted forwardly into reproduce position the cartridge 64 then operating as a reproducer is connected through pole 103 and its "*b*" contact to the transducer 96 operating as a receiver. The pole 105 is now in open position to break the connection of the oscillator 98 with the amplifier.

In FIGURES 6 and 8 there is shown at 108 the type of groove which is obtained by embossing when there is used a small stylus having a tip radius of about ¼ mil and a low bias of the order of 3 to 5 grams force on the record but without any high frequency excitation being fed into the recorder. For instance, such groove is very shallow and wholly unsuitable as a tracking guide for the stylus in reproducing. If the weight of the recorder on the record were increased to obtain a sufficiently deep groove suitable as an effective tracking guide, record tearing would result and also the lateral modulation of the groove responsive to an impressed audio signal would be relatively small because of the heavy load which the record material would impose on the recorder stylus.

When a high level of superimposed high frequency current is fed into the recorder in accordance with my invention, the stylus forms a wider, deeper groove with a steeper side wall as shown at 109 in FIGURES 6 and 9. In other words, with the same stylus and low stylus pressure there is now obtained a deep, wide groove without incurring any record scratching or tearing which inevitably would result were an effort made to obtain such deep, wide grooves by merely increasing the stylus pressure. There are several reasons why this deeper and wider groove is obtained: (1) the high oscillating current fed into the recorder vibrates the stylus to perform much of the work required in indenting the record material to enable a given depth of groove to be obtained with a much-reduced stylus pressure, and (2) the laterally vibrating stylus is heated by its increased frictional engagement with the record material, as well as by the heating of the beam 84 itself, to reduce the flow of resistance of the record material and to cause the material to set more permanently—i.e., to have less rebound. Because of these heating effects, the stylus responds more linearly and with greater amplitude to the impressed audio signals to be recorded, with the result that the recording is made with greater signal-to-noise ratio and with less distortion. The wider and deeper groove with the steeper side wall provides also a more positive guide for the stylus during reproducing to cause the stylus to track more faithfully a modulated groove 110 as shown in FIGURE 7. This is true whether the same stylus is used during reproducing as during recording or whether a larger reproducing stylus is used because if the same stylus 65 is used the flat bottom wall of the groove 109 will yield to the pressure of the very tip of the stylus until the side walls of the stylus seat against the side walls of the groove as illustrated in FIGURE 9, and if a reproducing stylus 111 having a larger tip radius is used it will seat directly on the side walls of the groove as indicated in FIGURE 9. Since a relatively deep, wide groove is now obtained having very fine modulation achieved by use of a very small recorder stylus, and this groove can be played back with an equally fine reproducer stylus, I can obtain a higher quality of recordation at a given record speed or, alternatively, a given quality of recordation at a slower record speed than has been heretofore feasible. Since my invention permits the use of recorder styli having tip radii as small as .1 mil or even less recordings of good speech quality can be made at remarkably low record speeds as low as only 4 r.p.m. This opens a new field for so-called "talking book" recordings, especially for the blind, since by new recording technique several hours recording can be made on each side of a standard disc 10" in diameter.

The most desirable relationship in carrying out my invention is that wherein the stylus size, linear groove speed and frequency of excitation current are such as to cause "cusping" to occur, it being meant by the term "cusping" that the stylus in each lateral excursion responsive to the high frequency excitation current partially overlaps the path which the stylus described in the last preceding such excursion. This means that the stylus is called on to displace less record material per unit of movement thereof relative to the record than would be the case were "cusping" not to occur. The condition for obtaining "cusping" is that the frequency of the superimposed excitation current should bear such relation to the linear groove speed that the linear travel of the stylus in the direction of the groove is at most equal to the cross sectional dimension of the portion of the stylus engaging the record during each cycle of the superimposed excitation. For example, if the linear groove speed is 7½ inches per second and the tip diameter of the stylus portion engaging the record is of the order of .5 mil, the minimum excitation frequency is preferably of the order of 15,000 c.p.s. When this condition is achieved the side walls of the groove are slightly scalloped as indicated in FIGURES 6 and 7.

By way of example, my invention may be carried out with a stylus having a tip radius of .25 mils, a bias force against the record of 3 to 5 grams, and an excitation voltage on the recorder cartridge of about 100 volts amplitude and about 30,000 c.p.s. With these operating conditions, recordings have been made using the cartridge herein described which are substantially flat from 40 to 15,000 c.p.s., and which have a signal-to-noise ratio of more than 40 db with a distortion of less than 2%. As another example, the stylus tip may have a .1 mil radius, the groove pitch may be 1.6 mils and the record speed may be 8 r.p.m. Under these conditions there is provided a playing time on each side of a 10" disc record of as much as six hours with an average frequency response across the record up to 7500 c.p.s.

The grooves so formed in the record medium by my invention can be tracked reliably by the same cartridge with the same stylus pressure without need for introducing any compliance in the tone arm other than that which is provided between it and the carriage. Preferably, this compliance is so adjusted relative to the moment of inertia of the tone arm that the arm has an inherent resonant frequency in the lower audio range, typically at about 100 c.p.s. This provides the desired crossover point below which the recording is substantially on a constant amplitude basis. Also, it aids in using the same cartridge for reproducing as for recording because in the lower constant amplitude range of the compliance of the tone-arm mounting yields to enable tracking of the record groove by the stylus without imposing any substantial record wear. At higher frequencies the tone arm is substantially rigid to the vibrations picked up by the stylus but since the effective mass of the cartridge beam 84 is very small and its stiffness is also small at these higher frequencies, it responds to the groove modulations again without imposing any substantial record wear. The same tone-arm system is therefore usable during reproducing as during recording when high frequency excitation current is superimposed on the audio signals during recording.

The embodiment of my invention herein particularly shown and described is intended to be illustrative and not necessarily limitative of my invention since the same is subject to changes and modifications without departure from the scope of my invention which I endeavor to set forth according to the following claims.

I claim:

1. In a phonographic recorder-reproducer including a support for a moving record: a recorder-reproducer head adapted to have a substantially even response through the audio range and lower portion of the supersonic range, an audio frequency input to the head, a supersonic frequency input to the head, said head including a beam coupled to and responsive to the audio and supersonic inputs having a stylus secured rigidly to a free end portion thereof for engaging the record; means mounting said beam for vibration of its free end in directions laterally of said groove, said mounting means including means to hold the other end of said beam substantially fixed; and rigid clamping means engaging an intermediate portion of the beam to force a node thereat in the vibration of the beam so that the beam will be responsive to a supersonic input well above audible range and vibrate in a standing wave having a node at the nodal point on the beam.

2. The phonographic recorder-reproducer having a recorder-reproducer head as set forth in claim 1 wherein said clamping means comprises two clamping elements rigidly holding the beam between them at a distance of about ⅓ its length from the free end of the beam.

3. A heat-resistant recorder-reproducer head adapted for recording and reproducing through the audio and into the supersonic frequency range comprising an audio frequency input to the head, a supersonic input to the head, a beam supported by the head and coupled to and responsive to the audio and supersonic inputs, a cartridge frame, a heat resistant means securing one end of said beam to said frame, clamping means on the frame rigidly engaging an intermediate portion of said beam to force a nodal point at the place of clamping and at least a double mode of vibration of the beam at all frequencies of response thereof, a stylus, and heat resistant means securing said stylus to the free end portion of said beam so that the beam will be responsive to a supersonic input well above audible range and vibrate in a standing wave having a node at the nodal point on the beam.

References Cited by the Examiner

UNITED STATES PATENTS

| | | | |
|---|---|---|---|
| 2,352,311 | 6/1944 | DiToro | 179—100.41 |
| 2,652,260 | 9/1953 | Bauer | 179—100.41 |

FOREIGN PATENTS

| | | |
|---|---|---|
| 698,989 | 10/1953 | Britain. |

BERNARD KONICK, *Primary Examiner.*

IRVING SRAGOW, *Examiner.*

V. P. CANNEY, M. K. KIRK, *Assistant Examiners.*